United States Patent
Hassan

(10) Patent No.: US 10,783,146 B2
(45) Date of Patent: Sep. 22, 2020

(54) JOIN OPERATIONS IN HYBRID MAIN MEMORY SYSTEMS

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 647 days.

(21) Appl. No.: 15/213,674

(22) Filed: Jul. 19, 2016

(65) Prior Publication Data
US 2018/0024922 A1    Jan. 25, 2018

(51) Int. Cl.
*G06F 16/2455* (2019.01)

(52) U.S. Cl.
CPC .... *G06F 16/24561* (2019.01); *G06F 16/2456* (2019.01)

(58) Field of Classification Search
CPC .............. G06F 16/24561; G06F 16/2456
USPC ......................................... 707/769
See application file for complete search history.

(56) References Cited

U.S. PATENT DOCUMENTS

| | | | |
|---|---|---|---|
| 5,845,325 A | 12/1998 | Loo | |
| 6,157,955 A | 12/2000 | Narad et al. | |
| 6,195,731 B1 | 2/2001 | Bordaz et al. | |
| 6,760,721 B1 | 7/2004 | Chasen | |
| 6,952,664 B1 | 10/2005 | Lahiri et al. | |
| 7,085,751 B2 * | 8/2006 | Finlay | G06F 16/2455 707/718 |
| 7,181,578 B1 | 2/2007 | Guha | |
| 7,360,073 B1 | 4/2008 | Billstrom et al. | |
| 7,434,002 B1 | 10/2008 | Zedlewski et al. | |
| 7,624,381 B1 | 11/2009 | Czajkowski et al. | |
| 7,774,556 B2 | 8/2010 | Karamcheti et al. | |
| 7,840,397 B2 | 11/2010 | Chiou | |
| 7,958,329 B2 | 6/2011 | Holt | |
| 8,170,859 B1 | 5/2012 | Christensson et al. | |
| 8,185,471 B1 | 5/2012 | Walker et al. | |
| 8,214,191 B2 | 7/2012 | Ferren et al. | |
| 8,230,395 B1 | 7/2012 | Koh et al. | |

(Continued)

FOREIGN PATENT DOCUMENTS

WO    2016167824    10/2016

OTHER PUBLICATIONS

U.S. Office Action in related U.S. Appl. No. 15/213,754 dated Jan. 29, 2019, 29 pages.

(Continued)

*Primary Examiner* — Taelor Kim
*Assistant Examiner* — Abdullah A Daud
(74) *Attorney, Agent, or Firm* — Fish & Richardson P.C.

(57) ABSTRACT

Implementations of the present disclosure include methods, systems, and computer-readable storage mediums for receiving an annotated query execution plan (aQEP), the aQEP being processed to execute a query on an in-memory database in a hybrid memory system, and including one or more annotations, each annotation indicating an output of a respective operator that is to be provided as input to a join operator, determining a payload size at least partially based on an estimated size of an intermediate output of the join operator, selecting a memory type from a plurality of memory types in the hybrid memory system based on the payload size and a cache size, and storing, after execution of the aQEP, the intermediate output on the memory type in the hybrid memory system.

14 Claims, 3 Drawing Sheets

(56) References Cited

U.S. PATENT DOCUMENTS

| | | |
|---|---|---|
| 8,456,905 B2 | 6/2013 | Kasorla |
| 8,572,051 B1* | 10/2013 | Chen ............... G06F 16/24532 |
| | | 707/687 |
| 8,862,588 B1 | 10/2014 | Gay |
| 8,868,537 B1 | 10/2014 | Colgrove et al. |
| 8,874,846 B2 | 10/2014 | Franceschini |
| 8,880,687 B1 | 11/2014 | Chandrachari et al. |
| 8,959,611 B1 | 2/2015 | Vincent |
| 8,966,462 B2 | 2/2015 | Gounares et al. |
| 9,043,530 B1 | 5/2015 | Sundaram et al. |
| 9,304,913 B2 | 4/2016 | Dong et al. |
| 9,348,539 B1 | 5/2016 | Saxena |
| 9,626,327 B2 | 4/2017 | Eilert et al. |
| 9,652,380 B2 | 5/2017 | Byun et al. |
| 9,672,158 B2 | 6/2017 | Karamcheti et al. |
| 9,712,538 B1 | 7/2017 | Vincent et al. |
| 9,720,925 B1 | 8/2017 | Lawson |
| 9,720,967 B2* | 8/2017 | Lee ................... G06F 16/24544 |
| 9,740,438 B2 | 8/2017 | Hassan |
| 9,841,914 B2 | 12/2017 | Hassan |
| 9,846,550 B2 | 12/2017 | Muralimanohar |
| 10,083,183 B2 | 9/2018 | Hassan |
| 2001/0027387 A1 | 10/2001 | Miyake et al. |
| 2003/0033431 A1 | 2/2003 | Shinomiya |
| 2003/0065648 A1 | 4/2003 | Driesch et al. |
| 2004/0184340 A1 | 9/2004 | Dwarkasdas |
| 2004/0193935 A1 | 9/2004 | Kato et al. |
| 2005/0097078 A1 | 5/2005 | Lohman et al. |
| 2005/0108447 A1 | 5/2005 | Thadani |
| 2006/0059474 A1 | 3/2006 | Bhansali et al. |
| 2006/0117299 A1 | 6/2006 | Goldsmith et al. |
| 2006/0218123 A1 | 9/2006 | Chowdhuri et al. |
| 2007/0050328 A1 | 3/2007 | Li |
| 2007/0050609 A1 | 3/2007 | Ferren et al. |
| 2007/0202473 A1 | 8/2007 | Koda |
| 2007/0226186 A1* | 9/2007 | Ewen ................ G06F 16/24542 |
| 2008/0005476 A1 | 1/2008 | Venkatesan |
| 2008/0034179 A1 | 2/2008 | Mewhinney et al. |
| 2008/0109592 A1 | 5/2008 | Karamcheti et al. |
| 2008/0140682 A1 | 6/2008 | Grosset et al. |
| 2008/0288718 A1 | 11/2008 | Hepkin et al. |
| 2008/0288742 A1 | 11/2008 | Hepkin et al. |
| 2009/0024568 A1 | 1/2009 | Al-Omari et al. |
| 2009/0049234 A1 | 2/2009 | Oh et al. |
| 2009/0157952 A1 | 6/2009 | Kim et al. |
| 2009/0157964 A1 | 6/2009 | Kasorla |
| 2009/0182976 A1 | 7/2009 | Agesen et al. |
| 2009/0307462 A1 | 12/2009 | Fleming et al. |
| 2010/0010799 A1 | 1/2010 | Altrichter |
| 2010/0023800 A1 | 1/2010 | Harari et al. |
| 2010/0042999 A1* | 2/2010 | Dorai ................... G06F 9/466 |
| | | 718/101 |
| 2010/0153631 A1 | 6/2010 | Moon et al. |
| 2010/0169602 A1 | 7/2010 | Hulbert et al. |
| 2010/0262633 A1 | 10/2010 | Bhattacharjee et al. |
| 2010/0287356 A1 | 11/2010 | Cameron et al. |
| 2010/0306591 A1* | 12/2010 | Krishna ............. G06F 11/3684 |
| | | 714/35 |
| 2010/0318718 A1 | 12/2010 | Eilert et al. |
| 2011/0066808 A1 | 3/2011 | Flynn et al. |
| 2011/0072006 A1 | 3/2011 | Yu et al. |
| 2011/0078340 A1 | 3/2011 | Kim et al. |
| 2011/0093654 A1 | 4/2011 | Roberts et al. |
| 2011/0131199 A1* | 6/2011 | Simon ............... G06F 16/24542 |
| | | 707/714 |
| 2011/0145221 A1 | 6/2011 | Kim et al. |
| 2011/0271264 A1 | 11/2011 | Vorbach et al. |
| 2011/0289126 A1* | 11/2011 | Aikas ................. H04L 67/1097 |
| | | 707/827 |
| 2011/0313999 A1 | 12/2011 | Bruno et al. |
| 2012/0072744 A1 | 3/2012 | Jain et al. |
| 2012/0089595 A1* | 4/2012 | Jaecksch ............... G06F 16/245 |
| | | 707/714 |
| 2012/0089803 A1 | 4/2012 | Dice |
| 2012/0124318 A1 | 5/2012 | Bivens |
| 2012/0144092 A1 | 6/2012 | Hsieh |
| 2012/0151127 A1 | 6/2012 | Lim |
| 2012/0151252 A1 | 6/2012 | Harris et al. |
| 2012/0158799 A1 | 6/2012 | Morsi et al. |
| 2012/0246392 A1* | 9/2012 | Cheon ................. G06F 12/0638 |
| | | 711/103 |
| 2012/0290768 A1 | 11/2012 | Rubowitz et al. |
| 2013/0013860 A1 | 1/2013 | Franceschini |
| 2013/0074092 A1 | 3/2013 | Gounares et al. |
| 2013/0080621 A1 | 3/2013 | Jain et al. |
| 2013/0081005 A1 | 3/2013 | Gounares et al. |
| 2013/0086309 A1 | 4/2013 | Lee |
| 2013/0103380 A1 | 4/2013 | Brandstatter et al. |
| 2013/0226903 A1 | 8/2013 | Wu et al. |
| 2013/0246698 A1 | 9/2013 | Estan |
| 2013/0275716 A1 | 10/2013 | Nishida |
| 2013/0283250 A1 | 10/2013 | Eichenberger |
| 2013/0326109 A1 | 12/2013 | Kivity |
| 2014/0007043 A1 | 1/2014 | Aliseychik et al. |
| 2014/0089564 A1 | 3/2014 | Liu et al. |
| 2014/0108723 A1 | 4/2014 | Nowoczynski |
| 2014/0188870 A1 | 7/2014 | Borthakur |
| 2014/0189204 A1* | 7/2014 | Sugimoto ............. G06F 3/0655 |
| | | 711/103 |
| 2014/0258266 A1 | 9/2014 | Craunes et al. |
| 2014/0280685 A1 | 9/2014 | Magenheimer |
| 2014/0281212 A1 | 9/2014 | Schreter et al. |
| 2014/0281249 A1 | 9/2014 | Waldsperger |
| 2014/0282455 A1 | 9/2014 | Felch |
| 2014/0293801 A1 | 10/2014 | Dimou |
| 2014/0310462 A1 | 10/2014 | Waldspurger et al. |
| 2014/0351411 A1 | 11/2014 | Woods et al. |
| 2014/0372428 A1* | 12/2014 | Mathis ................. G06F 16/258 |
| | | 707/736 |
| 2015/0012465 A1 | 1/2015 | Pingenot |
| 2015/0062736 A1 | 3/2015 | Kim et al. |
| 2015/0077426 A1 | 3/2015 | Kweon et al. |
| 2015/0081300 A1 | 3/2015 | Kim |
| 2015/0089604 A1 | 3/2015 | Mathew |
| 2015/0106582 A1 | 4/2015 | Mai et al. |
| 2015/0154087 A1* | 6/2015 | Jin ....................... G06F 3/0619 |
| | | 714/15 |
| 2015/0169226 A1 | 6/2015 | Shen et al. |
| 2015/0199126 A1 | 7/2015 | Jayasena |
| 2015/0206574 A1 | 7/2015 | Greathouse |
| 2015/0309789 A1 | 10/2015 | Thorat |
| 2015/0363319 A1 | 12/2015 | Qi |
| 2015/0370560 A1 | 12/2015 | Tan |
| 2015/0378169 A1 | 12/2015 | Naeimi |
| 2016/0019132 A1 | 1/2016 | Vilakkunnadathil |
| 2016/0117241 A1 | 4/2016 | Shah et al. |
| 2016/0117258 A1 | 4/2016 | Karamcheti et al. |
| 2016/0125927 A1 | 5/2016 | Wei |
| 2016/0150003 A1 | 5/2016 | Magdon-Ismall |
| 2016/0179685 A1 | 6/2016 | Byun et al. |
| 2016/0188217 A1 | 6/2016 | Golander et al. |
| 2016/0196112 A1 | 7/2016 | Edwards et al. |
| 2016/0196324 A1 | 7/2016 | Haviv et al. |
| 2016/0205174 A1 | 7/2016 | Pitio et al. |
| 2016/0005423 A1 | 8/2016 | Neppalli et al. |
| 2016/0253093 A1 | 9/2016 | Zhang |
| 2016/0283393 A1* | 9/2016 | Kawaba ............... G06F 12/0893 |
| 2016/0321048 A1 | 11/2016 | Matsuura |
| 2016/0328169 A1 | 11/2016 | Hassan |
| 2016/0336069 A1 | 11/2016 | Lin |
| 2016/0378169 A1 | 12/2016 | Naeimi |
| 2016/0378829 A1* | 12/2016 | Vengerov ............ G06F 16/24545 |
| | | 707/714 |
| 2016/0378977 A1 | 12/2016 | Alme |
| 2017/0010817 A1 | 1/2017 | Lim |
| 2017/0010952 A1* | 1/2017 | Nandakumar ............ G06F 8/30 |
| 2017/0052741 A1 | 2/2017 | Hassan |
| 2017/0052742 A1 | 2/2017 | Hassan |
| 2017/0060740 A1 | 3/2017 | Doerner |
| 2017/0090776 A1 | 3/2017 | Kowles |
| 2017/0091334 A1 | 3/2017 | Kabiljo et al. |
| 2017/0115892 A1 | 4/2017 | Gokita |
| 2017/0116210 A1* | 4/2017 | Park ....................... G06F 9/542 |

(56) References Cited

U.S. PATENT DOCUMENTS

| | | |
|---|---|---|
| 2017/0147516 A1 | 5/2017 | De |
| 2017/0154136 A1 | 6/2017 | Eckmann et al. |
| 2017/0160955 A1 | 6/2017 | Jayasena |
| 2017/0161198 A1 | 6/2017 | Trika |
| 2017/0193136 A1 | 7/2017 | Prasad et al. |
| 2017/0206010 A1 | 7/2017 | Nachimuthu |
| 2017/0206172 A1 | 7/2017 | Ma |
| 2017/0212843 A1 | 7/2017 | Agesen et al. |
| 2017/0220256 A1 | 8/2017 | Balasubramonian |
| 2017/0220257 A1 | 8/2017 | Balasubramonian |
| 2017/0220488 A1 | 8/2017 | Balasubramonian |
| 2017/0220516 A1 | 8/2017 | Eilert et al. |
| 2017/0223046 A1 | 8/2017 | Singh |
| 2017/0242595 A1 | 8/2017 | Niu |
| 2017/0255674 A1* | 9/2017 | Attaluri ............. G06F 16/24544 |
| 2017/0289000 A1 | 10/2017 | Parks et al. |
| 2017/0301386 A1 | 10/2017 | Parks et al. |
| 2017/0352012 A1* | 12/2017 | Hearn ................ G06Q 20/3827 |
| 2018/0024750 A1 | 1/2018 | Hassan |
| 2018/0024754 A1 | 1/2018 | Hassan |
| 2018/0024755 A1 | 1/2018 | Hassan |
| 2018/0024821 A1 | 1/2018 | Hassan |
| 2018/0024913 A1 | 1/2018 | Hassan |
| 2018/0024923 A1 | 1/2018 | Hassan |
| 2018/0024928 A1 | 1/2018 | Hassan |
| 2018/0024997 A1 | 1/2018 | Hassan |
| 2018/0025016 A1 | 1/2018 | Hassan |
| 2018/0025055 A1 | 1/2018 | Hassan |
| 2018/0025904 A1 | 1/2018 | Hassan |
| 2019/0057131 A1 | 2/2019 | Hassan |

OTHER PUBLICATIONS

U.S. Office Action in related U.S. Appl. No. 15/213,816 dated Feb. 7, 2019, 27 pages.
U.S. Office Action in related U.S. Appl. No. 15/214,102 dated Feb. 6, 2019, 34 pages.
U.S. Appl. No. 15/677,700, Hassan.
Dhiman et al., "PDRAM A hybrid PRAM and DRAM main memory system," Proceedings of the 46th Annual Design Automation Conference, Jul. 26-31, 2009, pp. 664-669.
Hassan et al., "Analytical models and techniques for Software-Managed Energy-Efficient Hybrid DRAM/NVM Main Memory," AMC International Conference on Computing Frontiers 2015, May 18-21, 2015.
Hassan et al., "Energy-Efficient In-Memory Data Stores on Hybrid Memory Hierarchies," Eleventh International Workshop on Dada Management on New Hardware, Jun. 2015, last retrieved from https//event.cwi.nl/damon2015/slides/slides-hassan.pdf on Jan. 5, 2018.
Hu et al., "Data allocation optimization for hybrid scratch pad memory with SRAM and nonvolatile memory," IEEE Transactions on Very Large Scale Integration (VLSI) Systems, Jun. 2013, 21(6) 1094-1102.
Li et al., "Assert(!Defined(Sequential I/O))," Proceedings of the 6th USENIX Conference on Hot Topics in Storage and File Systems, Jun. 17-18, 2014, 1-5.
Luk et al., "Pin Building Customized Program Analysis Tools with Dynamic Instrumentation," ACM Sigplan Notices, Jun. 2005, 40(6) 190-200.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
U.S. Office Action in related U.S. Appl. No. 15/213,621 dated Dec. 13, 2018, 12 pages.
U.S. Office Action in related U.S. Appl. No. 15/213,621 dated May 17, 2018, 11 pages.
U.S. Office Action in related U.S. Appl. No. 15/213,654 dated Dec. 1, 2017, 21 pages.
U.S. Office Action in related U.S. Appl. No. 15/213,654 dated Jul. 2, 2018, 41 pages.
U.S. Office Action in related U.S. Appl. No. 15/213,654 dated Mar. 16, 2018, 31 pages.
U.S. Office Action in related U.S. Appl. No. 15/213,654 dated Nov. 27, 2018, 7 pages.
U.S. Office Action in related U.S. Appl. No. 15/213,754 dated Feb. 27, 2018, 23 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Jul. 26, 2018, 27 pages.
U.S. Office Action in related U.S. Appl. No. 15/213,930 dated Jun. 19, 2018, 20 pages.
U.S. Office Action in related U.S. Appl. No. 15/213,930 dated Mar. 9, 2018, 20 pages.
U.S. Office Action in related U.S. Appl. No. 15/213,930 dated Oct. 20, 2018, 23 pages.
U.S. Office Action in related U.S. Appl. No. 15/213,960 dated Dec. 13, 2018, 22 pages.
U.S. Office Action in related U.S. Appl. No. 15/213,960 dated Jan. 11, 2018, 22 pages.
U.S. Office Action in related U.S. Appl. No. 15/213,960 dated Jul. 12, 2018, 24 pages.
U.S. Office Action in related U.S. Appl. No. 15/214,019 dated Aug. 27, 2018, 8 pages.
U.S. Office Action in related U.S. Appl. No. 15/214,019 dated Dec. 22, 2017, 12 pages.
U.S. Office Action in related U.S. Appl. No. 15/214,019 dated Jun. 14, 2018, 10 pages.
U.S. Office Action in related U.S. Appl. No. 15/214,082 dated Aug. 27, 2018, 27 pages.
U.S. Office Action in related U.S. Appl. No. 15/214,102 dated Jul. 24, 2018, 33 pages.
Wang et al., "Optimizated Allocation of Data Variables to PCM/DRAM-based Hybrid Main Memory for Real-Time Embedded Systems," Embedded Systems Letters, IEEE, Sep. 2014, 6(3) 61-64.
Office Action in U.S. Appl. No. 15/213,930 dated Feb. 26, 2019, 35 pages.
Final Office Action issued in U.S. Appl. No. 15/214,082 dated Mar. 8, 2019, 41 pages.
Non-final office action issued in U.S. Appl. No. 15/214,082 dated Sep. 6, 2019, 36 pages.
Final office action issued in U.S. Appl. No. 15/213,654 dated Jul. 18, 2019, 21 pages.
Chen et al., ""FSRAM: Flexible Sequential and Random AccessMemory for Embedded Systems"" Laboratory for Advanced Research in Computing Technology and Compilers Technical Report No. ARCTiC, Mar. 1, 2004, 6 pages.
Dulloor et al., "Data tiering in heterogeneous memory systems" Proceedings of the Eleventh European Conference on Computer Systems, ACM, Apr. 18, 2016, 16 pages.
Ouyang et al., "SSD-Assisted Hybrid Memory to Accelerate Menncached over High Performance Networks" 2012 41st International Conference on Parallel Processing, IEEE, Sep. 10, 2012, 10 pages.
U.S. Office Action in related U.S. Appl. No. 15/213,626 dated Apr. 12, 2019, 23 pages.
U.S. Office Action in related U.S. Appl. No. 15/213,674 dated Apr. 12, 2019, 27 pages.
U.S. Office Action in related U.S. Appl. No. 15/213,754 dated May 23, 2019, 32 pages.
U.S. Office Action in related U.S. Appl. No. 15/213,816 dated Jun. 18, 2019, 46 pages.
Wang et al., "NVMalloc: Exposing an Aggregate SSD Store as a Memory Partition in Extreme-Scale Machines" 2012 IEEE 26th International Parallel and Distributed Processing Symposium, May 21, 2012, 12 pages.

(56) References Cited

OTHER PUBLICATIONS

Zakai, "Emscripten: An LLVM-to-JavaScript Compiler," Proceedings of the ACM international conference companion on Object oriented programming systems languages and applications companion (OOPSLA), Portland, Oregon, Oct. 22-27, 2011, 12 pages.
Non-final office action issued in U.S. Appl. No. 15/677,700 dated Nov. 18, 2019, 60 pages.
Final office action issued in U.S. Appl. No. 15/213,626 dated Oct. 18, 2019, 41 pages.
Non-Final Office Action issued in U.S. Appl. No. 15/213,626 dated Jun. 9, 2020, 45 pages.
Final office action issued in U.S. Appl. No. 15/214,082 dated Mar. 19, 2020, 38 pages.
U.S. Appl. No. 14/704,461, filed May 5, 2015, Ahmad Hassan.
U.S. Appl. No. 14/831,567, filed Aug. 20, 2015, Ahmad Hassan.
U.S. Appl. No. 14/831,624, filed Aug. 20, 2015, Ahmad Hassan.
Final office action issued in U.S. Appl. No. 15/213,816 dated Jan. 2, 2020, 43 pages.

\* cited by examiner

JOIN OPERATIONS IN HYBRID MAIN MEMORY SYSTEMS

BACKGROUND

Enterprises, such as business enterprises, operate enterprise systems to provide software functionality to customers and employees. In some examples, an enterprise system can include back-end enterprise servers that host enterprise applications. Example enterprise applications include enterprise resource planning (ERP) systems, client-relationship management (CRM) systems, product lifecycle management (PLM) systems, supply chain management (SCM) systems, and supplier relationship management (SRM) systems. During operation of an enterprise application, application data is accessed, which is stored in main memory of the enterprise server. In this manner, the application data is immediately accessible by processors of the enterprise server.

Increasingly large amounts of application data are stored in the main memory of enterprise servers. Main memory can include dynamic random access memory (DRAM), which consumes a relatively high amount of static energy (both in active and idle states) due to continuous leakage and refresh power. Various byte-addressable non-volatile memory (NVM) technologies (e.g., memristors) promise near-zero static energy and persistence. However, such NVM can suffer from increased latency and increased dynamic energy.

SUMMARY

Implementations of the present disclosure include computer-implemented methods for selectively placing intermediate results of a join operator in one of a plurality of memory types in a hybrid memory system. In some implementations, methods include actions of receiving an annotated query execution plan (aQEP), the aQEP being processed to execute a query on an in-memory database in a hybrid memory system, and including one or more annotations, each annotation indicating an output of a respective operator that is to be provided as input to a join operator, determining a payload size at least partially based on an estimated size of an intermediate output of the join operator, selecting a memory type from a plurality of memory types in the hybrid memory system based on the payload size and a cache size, and storing, after execution of the aQEP, the intermediate output on the memory type in the hybrid memory system.

These and other implementations can each optionally include one or more of the following features: the memory type includes one of dynamic random access memory (DRAM) and non-volatile memory (NVM); the memory type is selected as DRAM in response to determining that the payload size exceeds at least a portion of the cache size; the memory type is selected as NVM in response to determining that the payload size does not exceeds at least a portion of the cache size; the payload size is determined based on a size of a first relation and a size of a second relation that are provided as input to the join operator; one or more of the first relation and the second relation are indicated within the aQEP by respective annotations; and the join operator includes one of a merge-join operator, and a hash-join operator.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
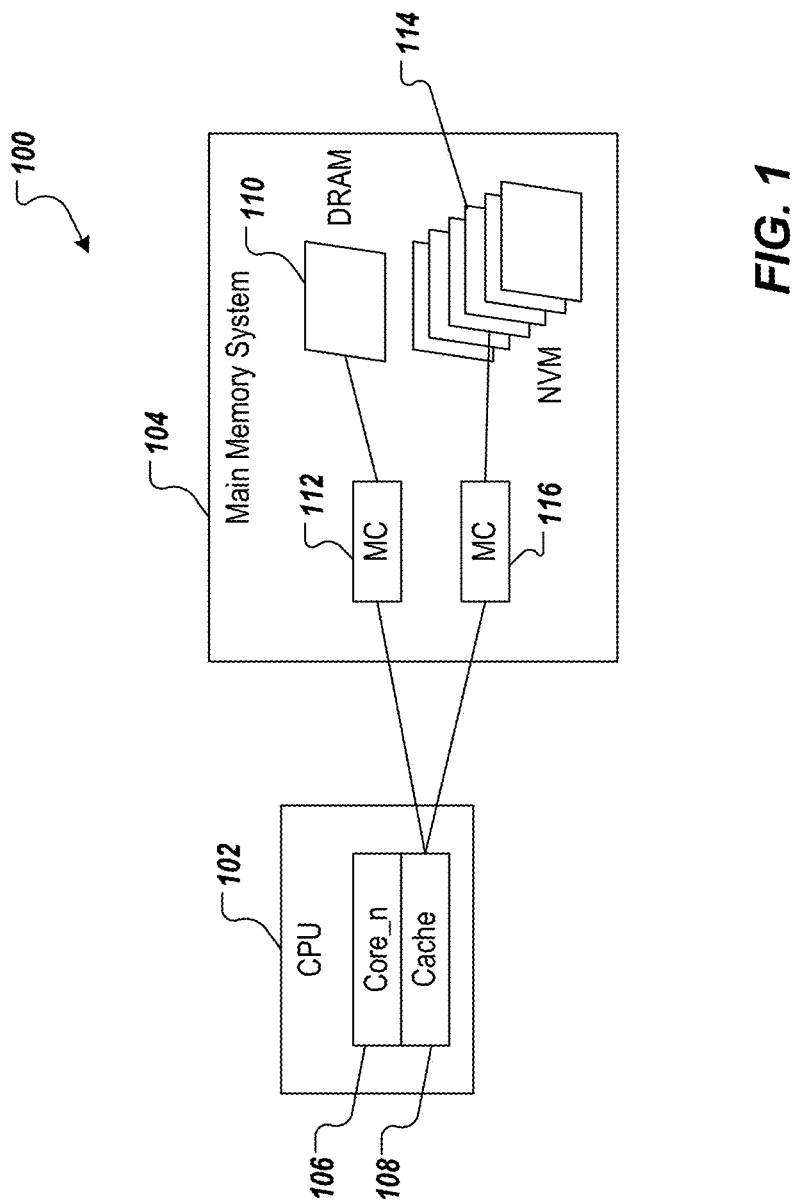
FIG. 1 depicts an example memory architecture in accordance with implementations of the present disclosure.

Implementations of the present disclosure are generally directed to managing hybrid main memory including dynamic random access memory (DRAM) and non-volatile memory (NVM). More particularly, implementations of the present disclosure are directed to selectively placing intermediate results of a join operator in one of a plurality of memory types in a hybrid memory system of an in-memory database system. In some implementations, actions can include receiving an annotated query execution plan (aQEP), the aQEP being processed to execute a query on an in-memory database in a hybrid memory system, and including one or more annotations, each annotation indicating an output of a respective operator that is to be provided as input to a join operator, determining a payload size at least partially based on an estimated size of an intermediate output of the join operator, selecting a memory type from a plurality of memory types in the hybrid memory system based on the payload size and a cache size, and storing, after execution of the aQEP, the intermediate output on the memory type in the hybrid memory system.

In-memory database systems are a key enabler for real-time data analytics. The key motivation behind in-memory databases is to avoid I/O disk delays by retaining the database in main memory. In order to sustain this design philosophy, which results in significant performance improvements for database management systems (DBMS), servers are equipped with perpetually larger amounts of main memory to keep up with growing data set sizes. Increasing the size of main memory is however meeting technological limitations.

DRAM, the dominant technology for main memory, has hit power and scaling limitations. DRAM-based main memory consumes 30-40% of the total server power due to leakage and refresh power consumption. The background power consumption of DRAM scales proportionally with the DRAM size, adding to the total cost of ownership (TCO). Moreover, it has yet to be seen whether DRAM technology can be scaled below 40 nm feature sizes. This may effectively imply a cap on the amount of memory that can fit within a single server.

Byte-addressable NVM is emerging as a compelling alternative to DRAM due to its higher density and lower leakage power relative to that of DRAM. Also, NVM has the potential to scale to smaller feature sizes, and has approximately 100× lower static energy than DRAM due to the absence of refresh operations. NVM, however, has its own drawbacks: increased latency and increased dynamic energy for NVM accesses, reduced memory bandwidth, and a fast wear-out of memory cells.

Various NVM technologies have been proposed, each with different strengths and weaknesses in energy, performance, durability, density, and scalability. Example NVM technologies include phase change memory (PCM), spin transfer torque memory (STT-RAM), and resistive RAM (RRAM). Regardless of the particular NVM technology, it may be expected that reading and writing from/to memory will take longer for NVM than for DRAM, and will consume more energy, with writing suffering more than reading. Consequently, NVM is not a drop-in replacement for DRAM.

An attractive solution to incorporate NVM technologies in main memory is to use DRAM and NVM side by side in a hybrid main memory system. While DRAM provides high performance, it is not feasible to have large amounts of DRAM. On the other hand, NVM can be scaled up to provide large amounts of memory, but NVM cannot be accessed as efficiently as DRAM.

FIG. 1 depicts an example memory architecture 100 that can be implemented within an enterprise server. In the example of FIG. 1, the example memory architecture 100 includes a central processing unit (CPU) 102 and a main memory system 104. The CPU 102 includes a core 106 having a respective cache 108. Although a single core and respective cache 108 is depicted, it is appreciated that the CPU 102 can include multiple cores, each with a respective cache. Further, although a single CPU 102 is depicted, it is appreciated that enterprise servers can include multiple CPUs. The main memory system 104 includes DRAM 110 with a respective memory controller (MC) 112, and NVM 114 with a respective MC 116. In some examples, the cache 108 accesses (e.g., read, write, delete) the DRAM 110 through the MC 112, and accesses (e.g., read, write, delete) the NVM 114 through the MC 114.

In some examples, the example memory architecture 100 can be implemented in an in-memory database system. In some examples, an in-memory database system is a database management system that uses main memory for data storage. In some examples, main memory includes random access memory (RAM) that communicates with one or more processors, e.g., central processing units (CPUs), over a memory bus. An in-memory database system can be contrasted with database management systems that employ a disk storage mechanism. In some examples, in-memory database systems are faster than disk storage databases, because internal optimization algorithms can be simpler and execute fewer CPU instructions. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data). An example in-memory database system includes HANA, provided by SAP SE of Walldorf, Germany.

One issue to be addressed is the distribution of data over memory types in hybrid main memory systems. That is, on which type of memory should particular data be placed to minimize power loss without degrading performance to an unacceptable degree. Traditional techniques have proposed data migration policies for hybrid memory, where data migration is decided on the hardware, by the operating system (OS), or a mixture of both. Such techniques try to second-guess the properties of the workload and migrate large chunks of data, typically at the page granularity of the virtual memory system. This reactive approach, however, introduces runtime overhead and energy consumption due to monitoring and migration.

In view of the foregoing, and as described in further detail herein, implementations of the present disclosure are directed to executing data placement in hybrid main memory at the level of the database management system (DBMS). Implementations of the present disclosure are based on the structure and memory access patterns of in-memory databases, and the observation that data sets that are frequently accessed in main memory are typically intermediate data sets accessed by join operators. More particularly, it has been shown that 99% of off-chip accesses are generated from execution of join operators. Accordingly, implementations of the present disclosure address determining on what type of memory (e.g., DRAM or NVM) intermediate results of a join operator should be placed, and addresses merge-join and hash-join operators. In accordance with implementations of the present disclosure, the DBMS analyses a query execution plan (QEP) to predict which data sets will incur frequent memory accesses, and should thus be placed on DRAM. The DBMS allocates these data sets on DRAM as they are generated. By predicting the best placement with high accuracy, implementations of the present disclosure obviate migration of data between DRAM and NVM to fix wrong data placements. This enhances the performance and energy-efficiency of the in-memory database system.

To provide further context for implementations of the present disclosure, there are three main types of access patterns observed in database join operators: single sequential traversal, single random traversal, and repeated random traversal. In a single sequential traversal, a relation is scanned sequentially to look up an attribute or set of attributes. A relation S and a relation R will be referenced herein as inputs, and a relation P will be referenced herein as an output. In some examples, the relation is also referred to as a binary association table (BAT) (e.g., BAT_S, BAT_R, BAT_P). In some examples, BATs vertically partition multi-attribute relations, each including object identifier (OID) and attribute pairs (e.g., [OID, attribute]). Sequential accesses have relatively good cache locality, because consecutive values are read. This utilizes all data in the cache blocks fetched and allows the hardware prefetcher to be effective. However, if the size of a BAT is too large to fit in the available cache, and a large portion of the BAT needs to be scanned sequentially, significant main memory accesses are incurred. In such a case, the BAT should be stored on DRAM to avoid slow NVM. In a single random traversal, each attribute in a BAT is accessed exactly once and in a random order. The random access is typically performed through hash look-up. If a BAT does not fit in the cache, then random accesses incur significant cache misses. In a repeated random traversal, a BAT is repeatedly accessed randomly to perform attribute look-up.

With particular reference to merge-join, a merge-join operator (e.g., Merge_Join) on an inner input (e.g., relation R (BAT_R)) and an outer input (e.g., relation S (BAT_S)) sequentially traverses the inner input S, while the outer input R is being traversed. Merge-join performs a sequential scan on both the inputs and an output (e.g., relation P (BAT_P)). However, merge-join requires both of the inputs S, R to be in sorted order. An example access pattern in merge-join is provided as:

```
Merge Join(R,S,P)
        R ==> sequential
        S ==> sequential
        P ==> sequential
                where R - input, S - input, p - output
```

Because merge-join requires the inputs to be in a sorted order, if the inputs are not sorted, then a sort operation is called prior to executing the merge-join.

In some examples, most of the main memory accesses result from comparing BAT_R and BAT_S, where the DBMS performs the matching and adds the matching rows to the output relation (BAT_P). The initial size of the output (BAT_P) is estimated, but, if the number of matching tuples exceeds the allocated space, then a new allocation is made and all the previous output tuples are copied to the new output relation.

With particular reference to hash-join, a hash-join operator (e.g., Hash Join) performs sequential scan on the larger relation (e.g., S), and performs single random traversal (e.g., using a hash table) on the smaller relation (e.g., R) to find the matching tuples. Because the inner input is repeatedly looked-up in the hash table based random accesses, it is critical to keep the inner relation and hash within the cache. In order to achieve this, a partitioned hash-join can be implemented, which scans both input relations sequentially to produce n partitions according to hashing algorithm. The idea is to keep each partition with the available cache in order to minimize cache misses. During a partitioning phase, a hash table is computed for partition of smaller relation. During a probing phase, for each value of the larger relation, the smaller relation is scanned and the hash table is probed to find the matching tuples. Hash-join on relation R and relation S performs a sequential scan on the outer input (e.g., relation R) and the probe relation (e.g., the relation S) repeatedly through a hash on the probe relation. The complete access pattern within hash-join is a combination of sequential, single random traversal, and repeated random traversal, and an example is provided as:

```
Hash_Join(R, S, P)
Let 'H' be a computed HASH on 'S'
        R ==> sequential
        H ==> single random
        S ==> sequential
        S ==> repeated random
        P ==> sequential
                where R - input; S - input; P -
                output; H - HASH on S
```

In some examples, most of the main memory accesses result from the probing phase, where the DBMS performs the hash look-up and adds the matching rows to the output relation. The initial size of the output is estimated, but if the number of matching tuples exceeds the allocated space, a new allocation is made and all of the previous output tuples are copied to the new output relation. Both hash lookup (causing random accesses in the smaller relation S), and the growing of the output relation result main memory accesses.

In accordance with implementations of the present disclosure, for a join operator, large BATs are place on DRAM, and smaller BATs are placed on NVM. More particularly, and as described in further detail herein, intermediate results provided by the join operator are selectively stored in DRAM. In some examples, the intermediate results are either the output of the join operator, or are an input to the join operator.

In general, the output of a join operator is write-only, but it is impossible to know in advance how large the output will become. Consequently, the output BAT is grown incrementally. Initially, the expected output size is estimated and a buffer of the estimated size is allocated. As the output grows, and if the allocated buffer becomes full, a larger buffer is allocated, and the output produced so far is copied over. In some examples, the output buffer may be grown several times during execution of the join operator.

The preferred location of the output can vary during its construction. Initially, when the output is small, it may fit in the last-level cache (LLC) together with other BATs. For example, in the case of a join operator, performance is highest when the output and both of the inputs are stored together in the LLC (as well as the hash, in the case of a hash-join operator). When the working set of the join operator fits in the LLC, then the working set may be allocated on NVM, because none or few main memory accesses will be required. As the output grows, however, the working set size of the join operator may exceed the LLC cache size. At this point, it is better to place the output in DRAM, because it is likely that the output will be repeatedly accessed. It can be noted that migrating the output from NVM to DRAM incurs no overhead, because the operation coincides with an existing memory copy. That is, when the output buffer is grown, the new buffer can be directly allocated on DRAM. The copy of data from NVM to DRAM is required by the application anyway. Consequently, no extra memory accesses are required.

In accordance with implementations of the present disclosure, a payload size (payloadsize) is determined by aggregating the size of both the inputs and the estimated output. In some examples, the payload is the amount of data that is to be stored. In some examples, individual sizes of the inputs/output are each calculated as the product of the number of items N in a BAT and the width of the column W. In some examples, the width of a column depends on the datatype stored in the column. For example, if the column holds integer value datatype, then (e.g., on X86 machines) integers take 4 Bytes, which is the width of the column. In some examples, if the aggregated payload size exceeds the LLC size, a DRAM allocator is used to allocate the output to DRAM, otherwise a NVM allocator is used to allocate the output to NVM. In some examples, a factor $\lambda$ (e.g., 0.9) is used to discount the size of the LLC ($Size_{LLC}$), when comparing the payload size to the LLC. In some examples, where $0 < \lambda \leq 1$. In this manner, the decision to migrate can be triggered before the working set overflows the LLC. This is beneficial as other data (e.g., data not used in the join operation) may be present in the LLC.

With particular reference to a merge-join operator, Algorithm 1, below, provides an example algorithm for determining whether to place relations on DRAM or NVM in accordance with implementations of the present disclosure.

---
Algorithm 1: Merge-Join Inputs
--- mergedecision(BAT_R, BAT_S, BAT_P)
  //First Case: Allocate R When S does not exist
  If not exists BAT_POOL(S):
    rcount = tuple_count(R)
    $payload_{size} = 2 \times N_R W$
    //N is the number of items
    //W is the width of an item
    If($payload_{size} > \lambda\ Size_{LLC}$) then
      //Place larger BAT in DRAM
      Place R on DRAM
    Else
      //Place smaller BAT in NVM
      Place R on NVM
  //Second Case: Allocate S When R does not exist
  If not exists BAT_POOL(R):
    scount = tuple_count(S)
    $payload_{size} = 2 \times N_S W$
    //N is the number of items
    //W is the width of an item
    If($payload_{size} > \lambda\ Size_{LLC}$) then
      //Place larger BAT in DRAM
      Place S on DRAM
    Else
      //Place smaller BAT in NVM
      Place S on NVM
  //Third Case: Either one of R or S exists
  rcount = tuple_count(R)
  scount = tuple_count(S)
    Let E be the estimate result count:
    E = MIN(MAX(rcount, scount), MIN(rcount, scount) × 32)
    $payload_{size} = N_R W + N_S W + EW$
    //N is the number of items
    //W is the width of an item
    //R and S are join inputs
    //P is the intermediate output
    If($payload_{size} > \lambda\ Size_{LLC}$) then
      //Place smaller input on NVM
    If scount > rcount:
      Place S on DRAM
      Place R on NVM
    Else
      Place R on DRAM
      Place S on NVM

---

With continued reference to the merge-join operator, Algorithm 2, below, provides an example run-time algorithm to determine placement of a relation in memory.

---
Algorithm 2: Merge-Join Intermediate Output
---

Begin Merge_Join(R, S, P)
  rcount = tuple_count(R)
  scount = tuple_count(S)
  //Assuming S is a smaller relation
    Let E be the estimate result count:
    E = MIN(MAX(rcount, scount), MIN(rcount, scount) × 32)
    $payload_{size} = N_R W + N_S W + N_P W$
    //N is the number of items
    //W is the width of an item
    //R and S are join inputs
    //P is the intermediate output
    If ($payload_{size} > Size_{LLC}$) then
      Place output on DRAM
    Else
      Place output on NVM
  For r in R
    During Merge_Join comparisons
      If grow output relation
        $payload_{size} = N_R W + N_S W + newsize_{output}$
        if ($payload_{size} > \lambda\ Size_{LLC}$) then ---
Algorithm 2: Merge-Join Intermediate Output
--- grow output on DRAM
      else
        grow output on NVM
  End For
End

---

With continued reference to the merge-join operator, Algorithm 3, below, provides an example modified assembly language plan (e.g., MonetDB assembly language (MAL) plan) in accordance with implementations of the present disclosure. In some examples, a MAL plan is synonymous with a query execution plan (QEP). For example, a MAL plan is the term used for a QEP in the MonetDB database management system.

---
Algorithm 3: Example Modified MAL Plan
---

...
  //Add annotation for join input X_79
  X_79 := algebra.leftfetchjoin(X_77,X 2)<join:39>...
  <call:mergedecision(79,39)>
  X_28:bat[:oid,:oid] := sql.tid(X_1,"sys","partsupp")
  X_31 := sql.bind_idxbat(X_1,"sys","partsupp",
  .."partsupp_ps_suppkey_fkey",0)
  (X_34,r1_62) := sql.bind_idxbat(X_1,"sys",
  .."partsupp","partsupp_ps_suppkey_fkey",2)
  X_37 := sql.bind_idxbat(X 1,"sys","partsupp",
  .."partsupp_ps_suppkey_fkey",1)
  //Add annotation for join input X_39
  X_39 := sql.projectdelta(X 28,X 31,X 34,r1 62,...
  X_37)<join:79><call:mergedecision(79,39)>
  (X_80,r1_208) := algebra.mergejoin(X_79,X_39)
...

---

In some examples, the merge-join operator can have one large input, which has significant main memory accesses due to sequential scan. An analysis of main memory accesses confirms that a larger BAT incurs significant memory accesses. Consequently, there is merit to storing the larger input to the merge-join on DRAM. Migrating the input from NVM to DRAM prior to a join operator is, however, wasteful.

In order to avoid migrations, implementations of the present disclosure analyze the QEP prior to execution, and annotate which intermediate data sets will become inputs to a merge-join operator. In this manner, both inputs to the merge-join operator are identified. Further, a determination is made as to which input is the largest, which is determined at the time when the inputs are created. To achieve this, implementations of the present disclosure provide the following example heuristic: when creating the first of the inputs to a merge-join operator, the size of the merge-join operator's working set is estimated by assuming that the second input is smaller than the first input. This heuristic has been analyzed and has proven to work well for the benchmark queries provided in the TPC Benchmark H (TPC-H) provided by the Transaction Processing Performance Council of San Francisco, Calif. The TPC-H is a decision support benchmark that includes a set of business oriented ad-hoc queries (e.g., a set of benchmark queries including 22 queries), and concurrent data modifications. The TPC-H is described as being representative of decision support systems that examine large volumes of data, execute queries with a high degree of complexity, and provide answers to critical business questions.

Algorithms 1 and 3, above, provide an example of implementing this heuristic in MonetDB (an open source column-oriented DBMS developed at the Centrum Wiskunde & Informatica (CWI)). In some examples, QEPs in MonetDB are represented using the MAL plan. In accordance with implementations of the present disclosure, the outputs of all operators in the MAL plan that are inputs to the join operators in a later stage of the query plan are annotated. Algorithm 3, above, depicts an example portion of an annotated MAL plan. In the example of Algorithm 3, the outputs X_79 and X_39 are annotated to indicate that the respective output will be an input to a subsequent join operator. In each case, the ID of the second input to the consuming join is stored. In this manner, it can be determined whether the corresponding BAT has been created and, if so, what size it has. In some examples, a call is added to the heuristic algorithm mergedecision (Algorithm 1), which will be invoked when X_79 and X_39 of the example MAL plan are allocated.

Algorithm 1 provides example pseudo-code for three use cases, in which the mergedecision can be invoked. The first case and the second case are more complex, because none of the inputs exist. Consequently, and in some examples, an assumption is made that the second input will be as large as the first input. Further, and in some examples, it is assumed that the output of the merge-join will have the same size. Accordingly, and in some implementations, the working set size of the merge-join operator is estimated as two times the size of the currently created input. The currently created input is allocated on NVM, if the working set fits in the LLC. If the working set does not fit in the LLC, memory accesses will be frequent, and the input is allocated on DRAM. The third case in the decision procedure is more straight-forward. In some examples, when the other input already exists at the time the first input is created, the working set of the join operator can be estimated using the normal procedures. The input should be created on NVM, if the working set fits in the LLC, and on DRAM otherwise. In some examples, this determination is independent of the decision previously made for the first input.

With particular reference to a hash-join operator, Algorithm 4, below, provides an example algorithm for determining whether to place relations on DRAM or NVM in accordance with implementations of the present disclosure.

---

Algorithm 4: Hash-Join Inputs hashdecision(BAT_R, BAT_S)
  //First Case: Allocate R When S does not exist
  If not exists BAT_POOL(S):
    rcount = tuple_count(R)
    payload$_{size}$ = 3 × N$_R$W
      //N is the number of items
      //W is the width of an item
    If(payload$_{size}$ < λ Size$_{LLC}$) then
      //It's a smaller input
      Place R on DRAM
    Else
      Place R on NVM
  //Second Case: Allocate S When R does not exist
  If not exists BAT_POOL(R):
    scount = tuple_count(S)
    payload$_{size}$ = 3 × N$_S$W
      //N is the number of items
      //W is the width of an item
    If(payload$_{size}$ < λ Size$_{LLC}$) then
      //It's a smaller input
      Place S on DRAM
    Else
      //Place smaller BAT in NVM

---

-continued

Algorithm 4: Hash-Join Inputs

Place S on NVM
  //Third Case: Either one of R or S exists
    rcount = tuple_count(R)
    scount = tuple_count(S)
    Let E be the estimate result count:
    E = MIN(MAX(rcount, scount), MIN(rcount, scount) × 32)
    payload$_{size}$ = N$_R$W + N$_S$W + EW
      //N is the number of items
      //W is the width of an item
    If(payload$_{size}$ > λ Size$_{LLC}$) then
      //Place smaller input on DRAM
      If scount < rcount:
        Place S on DRAM
        Place R on NVM
      Else
        Place R on DRAM
        Place S on NVM

---

With continued reference to a hash-join operator, Algorithm 5, below, provides an example algorithm for a partitioned hash-join in accordance with implementations of the present disclosure.

---

Algorithm 5: Partitioned Hash-Join

Begin
  //Assuming S is a smaller relation
  //Partition S into n partitions
  For r in R
    Compute hash H$_n$ on S$_n$ partitions
    Probe H$_n$ for matching r$_n$
  End For
End

---

With continued reference to the merge-join operator, Algorithm 6, below, provides an example run-time algorithm to determine placement of a relation in memory.

---

Algorithm 6: Hash-Join Intermediate Output

Begin Hash_Join(R, S)
  rcount = tuple_count(R)
  scount = tuple_count(S)
  //Assuming S is a smaller relation
  //Partition S into n
  Let E be the estimate result count:
  E = MIN(MAX(rcount, scount), MIN(rcount, scount) × 32)
  payload$_{size}$ = N$_R$W + N$_S$W + EW
    //N is the number of items
    //W is the width of an item
  If(payload$_{size}$ > Size$_{LLC}$) then
    Place output on DRAM
  Else
    Place output on NVM
  For r in R
    Compute hash H$_n$ on S$_n$ partitions
    Probe H$_n$ for matching r$_n$
    If grow output relation
      payload$_{size}$ = N$_R$W + N$_S$W + newsize$_{output}$
      if(payload$_{size}$ > λ Size$_{LLC}$) then
        grow output on DRAM
      else
        grow output on NVM
  End For
End

---

With continued reference to the hash-join operator, Algorithm 7, below, provides an example modified assembly language plan (e.g., MAL plan) in accordance with implementations of the present disclosure.

Algorithm 7: Example Modified MAL Plan

```
...
//Add annotation for join input X_79
X_79 := algebra.leftfetchjoin(X_77,X 2)<join:39>...
  <call:hashdecision(79,39)>
X_28:bat[:oid,:oid] := sql.tid(X_1,"sys","partsupp")
X_31 := sql.bind_idxbat(X_1,"sys","partsupp",
  .."partsupp_ps_suppkey_fkey",0)
(X_34,r1_62) := sql.bind_idxbat(X_1,"sys",
  .."partsupp","partsupp_ps_suppkey_fkey",2)
X_37 := sql.bind_idxbat(X 1,"sys","partsupp",
  .."partsupp_ps_suppkey_fkey",1)
//Add annotation for join input X_39
X_39 := sql.projectdelta(X 28,X 31,X 34,r1 62,...
X_37)<join:79><call:hashdecision(79,39)>
  (X_80,r1_208) := algebra.hashjoin(X_79,X_39)
...
```

In some examples, the hash-join operator has one input, which can incur repeated main memory accesses, namely the smaller input S. This input relation is accessed repeatedly in random order. An analysis of main memory accesses confirms that the small input S indeed incurs significant memory accesses. As such, there is merit to store the smaller input to the hash-join on DRAM. Migrating the input from NVM to DRAM prior to a join operator is, however, wasteful.

In order to avoid migrations, and as similarly described above with respect to merge-join operators, implementations of the present disclosure analyze the QEP prior to execution, and annotate which intermediate data sets will become inputs to a join operator. In this manner, both inputs to the hash-join operator are identified. Further, a determination is made as to which input is the smallest, which is determined at the time when the inputs are created. To achieve this, implementations of the present disclosure provide the following example heuristic: when creating the first of the inputs to a hash-join operator, the size of the hash-join operator's working set is estimated by assuming that the second input and also the output will be as large as the first input. This heuristic has been analyzed and has proven to work well for the benchmark queries provided in the TPC-H, described above.

Algorithm 4 and 7, above, provide an example of implementing this heuristic in MonetDB. In accordance with implementations of the present disclosure, and as similarly described above with respect to merge-join operators, the outputs of all operators in the MAL plan that are inputs to the join operators in a later stage of the query plan are annotated. Algorithm 7, above, depicts an example portion of an annotated MAL plan. In the example of Algorithm 7, the outputs X_79 and X_39 are annotated to indicate that the respective output will be an input to a subsequent join operator. In each case, the ID of the second input to the consuming join is stored. In this manner, it can be determined whether the corresponding BAT has been created and, if so, what size it has. In some examples, a call is added to the heuristic algorithm hashdecision (Algorithm 4), which will be invoked when X_79 and X_39 of the example MAL plan are allocated.

Algorithm 4 provides example pseudo-code for three use cases, in which the hashdecision can be invoked. The first case and the second case are more complex, because none of the inputs exist. Consequently, and in some examples, an assumption is made that the second input will be as large as the first input. Further, and in some examples, it is assumed that the output of the merge-join will have the same size. Accordingly, and in some implementations, the working set size of the hash-join operator is estimated as three times the size of the currently created input. The currently created input is allocated on NVM, if the working set fits in the LLC. If the working set does not fit in the LLC, memory accesses will be frequent, and the input is allocated on DRAM. The third case in the decision procedure is more straight-forward. In some examples, when the other input already exists at the time the first input is created, the working set of the join operator can be estimated using the normal procedures. The input should be created on NVM, if the working set fits in the LLC, and on DRAM otherwise. In some examples, this determination is independent of the decision previously made for the first input.

It can also be noted that, and as described herein, the hash-join operator uses a hash. The hash, however, does not access memory by construction of the hash-join operator. Instead, it is executed by blocks to avoid translation lookaside buffer (TLB) accesses, and improve memory locality. It also keeps the hash table small. As such, the hash is always allocated on NVM.

Figure 2:
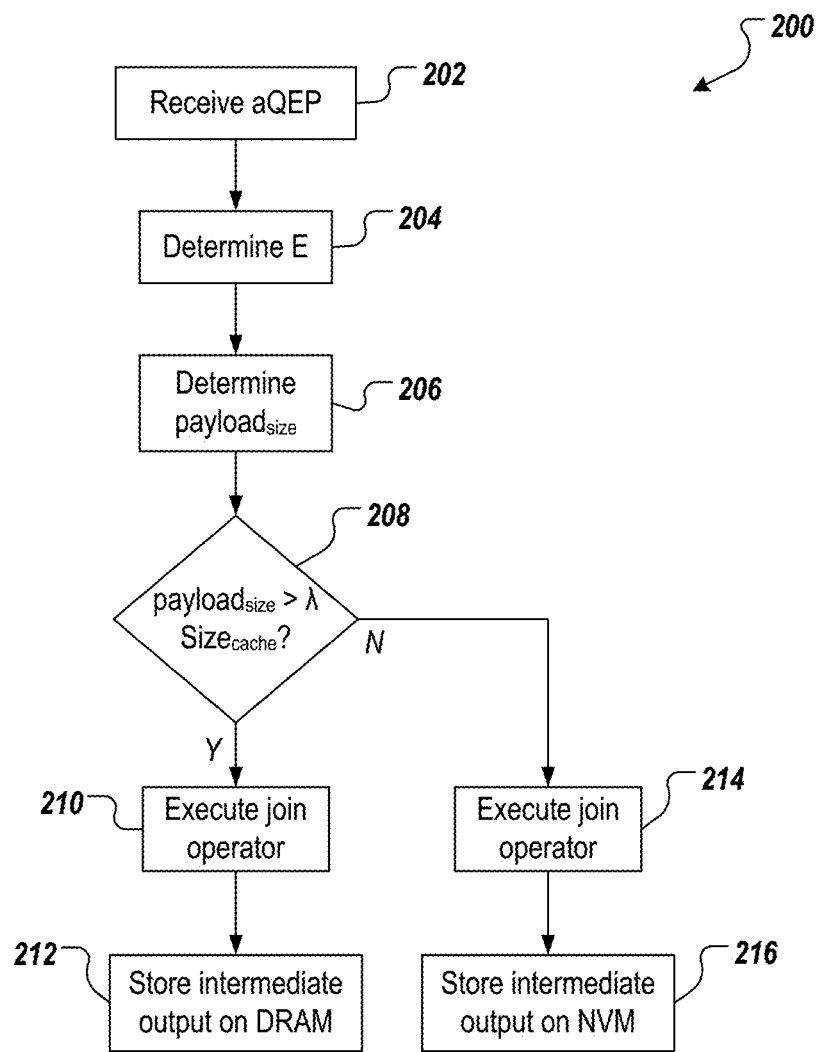
FIG. 2 depicts an example process that can be executed in accordance with implementations of the present disclosure.

FIG. 2 depicts an example process 200 that can be executed in accordance with implementations of the present disclosure. In some implementations, the example process 200 can be realized using one or more computer-executable programs executed using one or more computing devices. In some implementations, the DBMS executes processes described herein. For example, the DBMS can execute modified MAL plans to call mergedecision and/or hashdecision, and place inputs on DRAM/NVM in accordance with implementations of the present disclosure.

An aQEP is received (202). For example, a query is received from a user to query an in-memory database stored in a hybrid memory system. In some examples, aQEP is provided and includes a plurality of operators that are executed on the in-memory database to provide a result to the query. In some implementations, the aQEP includes one or more annotations, each annotation indicating an output of a respective operator that is to be provided as input to a subsequent join operator. An estimated size (E) of an intermediate output of the join operator is determined (204). In some examples, the estimated size of the intermediate output is determined based on respective sizes of a plurality of inputs to the join operator. In some examples, each input is provided as a relation stored in the in-memory database. A payload size (payload$_{size}$) is determined (206). In some examples, the payload size is determined at least partially based on the estimated size of the intermediate output of the join operator. In some examples, the payload size is determined based on the estimated size of the intermediate output of the join operator, and respective sizes of inputs to the join operator.

A memory type is selected from a plurality of memory types in the hybrid memory system based on the payload size and a cache size (Size$_{cache}$) (e.g., a size of the LLC). More particularly, it is determined whether the payload size exceeds at least a portion of the cache size (208). In some examples, at least a portion of the cache size includes the full cache size (e.g., $\lambda$Size$_{cache}$, where $\lambda$=1). In some examples, at least a portion of the cache size includes less than the full cache size (e.g., $\lambda$Size$_{cache}$, where 0<$\lambda$<1). If the payload size exceeds at least a portion of the cache size, the join operator is executed (210), and the intermediate output of the join operator is stored in DRAM (212). If the payload size does not exceed at least a portion of the cache size, the join operator is executed (214), and the intermediate output of the join operator is stored in NVM (216).

Figure 3:
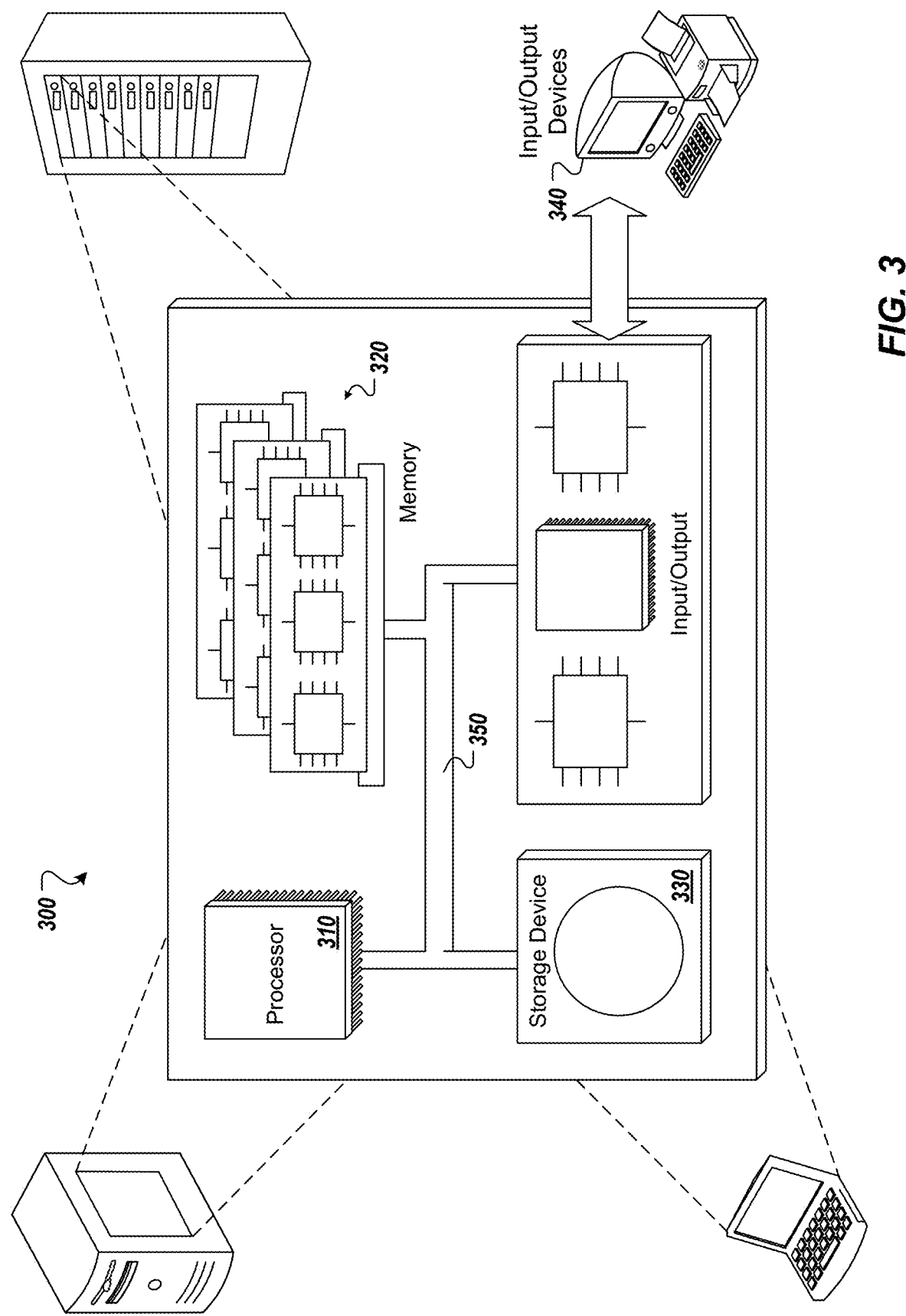
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 may be included in any or all of the server components discussed herein. The system 300 includes a processor 310, a memory 320, a storage device 330, and an input/output device 340. Each of the components 310, 320, 330, 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit. The storage device 330 is capable of providing mass storage for the system 300. In one implementation, the storage device 330 is a computer-readable medium. In various different implementations, the storage device 330 may be a floppy disk device, a hard disk device, an optical disk device, or a tape device. The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
receiving an annotated query execution plan (aQEP), the aQEP being processed to execute a query on an in-memory database in a hybrid memory system, and comprising one or more annotations, each annotation comprising a text marker within a QEP and indicating an output of a respective operator that is to be provided as input to a join operator;
identifying, during execution of the aQEP, a first input to a join operator based on a first annotation and a second input to the join operator based on a second annotation, the first input comprising a first binary association table (BAT) and the second input comprising a second binary association table (BAT);
determining a payload size at least partially based on a number of items in each of the first input and the second input to the join operator, a respective width of items of each of the first input and the second input to the join operator, and an estimated size of an intermediate output of the join operator;

selecting a first memory type for storing the first input from a plurality of memory types in the hybrid memory system based on the payload size, a portion of a cache size of a last-level cache (LLC) to prevent overflow of the LLC, a first count of the first input, and a second count of the second input;

storing the first input in the first memory type and the second input in a second memory type of the plurality of memory types, the first memory type being different from the second memory type;

during execution of the join operator and for each record in the first input:
  determining a grow output payload size based on the number of items in each of the first input and the second input to the join operator, the respective width of items of each of the first input and the second input to the join operator, and a grow output corresponding to a respective record, the grow output representing an incremental growth in output of the join operator based on the respective record during execution of the join operator, and
  selecting one of the first memory type and the second memory type for storing the grow output based on the grow output payload size and the portion of the cache size of the LLC;

determining an output payload size at least partially based on the number of items in each of the first input and the second input, the respective width of items of each of the first input and the second input, and an actual size of the intermediate output of the join operator;

selecting one of the first memory type and the second memory type for storing the intermediate output of the join operator based on the output payload size and the portion of the cache size of the LLC; and storing, after execution of the aQEP, the intermediate output in the one of the first memory type and the second memory type in the hybrid memory system.

2. The method of claim 1, wherein the first memory type comprises one of dynamic random access memory (DRAM) and non-volatile memory (NVM).

3. The method of claim 1, wherein the intermediate output is stored in DRAM in response to determining that the output payload size exceeds the portion of the cache size.

4. The method of claim 1, wherein the intermediate output is stored in NVM in response to determining that the payload size does not exceed the portion of the cache size.

5. The method of claim 1, wherein the join operator comprises one of a merge-join operator, and a hash-join operator.

6. A non-transitory computer-readable storage medium coupled to one or more processors and having instructions stored thereon which, when executed by the one or more processors, cause the one or more processors to perform operations comprising:

receiving an annotated query execution plan (aQEP), the aQEP being processed to execute a query on an in-memory database in a hybrid memory system, and comprising one or more annotations, each annotation comprising a text marker within a QEP and indicating an output of a respective operator that is to be provided as input to a join operator;

identifying, during execution of the aQEP, a first input to a join operator based on a first annotation and a second input to the join operator based on a second annotation, the first input comprising a first binary association table (BAT) and the second input comprising a second binary association table (BAT);

determining a payload size at least partially based on a number of items in each of the first input and the second input to the join operator, a respective width of items of each of the first input and the second input to the join operator, and an estimated size of an intermediate output of the join operator;

selecting a first memory type for storing the first input from a plurality of memory types in the hybrid memory system based on the payload size, a portion of a cache size of a last-level cache (LLC) to prevent overflow of the LLC, a first count of the first input, and a second count of the second input;

storing the first input in the first memory type and the second input in a second memory type of the plurality of memory types, the first memory type being different from the second memory type;

during execution of the join operator and for each record in the first input:
  determining a grow output payload size based on the number of items in each of the first input and the second input to the join operator, the respective width of items of each of the first input and the second input to the join operator, and a grow output corresponding to a respective record, the grow output representing an incremental growth in output of the join operator based on the respective record during execution of the join operator, and
  selecting one of the first memory type and the second memory type for storing the grow output based on the grow output payload size and the portion of the cache size of the LLC;

determining an output payload size at least partially based on the number of items in each of the first input and the second input, the respective width of items of each of the first input and the second input, and an actual size of the intermediate output of the join operator;

selecting one of the first memory type and the second memory type for storing the intermediate output of the join operator based on the output payload size and the portion of the cache size of the LLC; and storing, after execution of the aQEP, the intermediate output in the one of the first memory type and the second memory type in the hybrid memory system.

7. The computer-readable storage medium of claim 6, wherein the first memory type comprises one of dynamic random access memory (DRAM) and non-volatile memory (NVM).

8. The computer-readable storage medium of claim 6, wherein the intermediate output is stored in DRAM in response to determining that the output payload size exceeds the portion of the cache size.

9. The computer-readable storage medium of claim 6, wherein the intermediate output is stored in NVM in response to determining that the payload size does not exceed the portion of the cache size.

10. The computer-readable storage medium of claim 6, wherein the join operator comprises one of a merge-join operator, and a hash-join operator.

11. A system, comprising:
a computing device; and
a computer-readable storage device coupled to the computing device and having instructions stored thereon which, when executed by the computing device, cause the computing device to perform operations comprising:
receiving an annotated query execution plan (aQEP), the aQEP being processed to execute a query on an in-memory database in a hybrid memory system, and comprising one or more annotations, each annotation comprising a text marker within a QEP and indicating an output of a respective operator that is to be provided as input to a join operator;
identifying, during execution of the aQEP, a first input to a join operator based on a first annotation and a second input to the join operator based on a second annotation, the first input comprising a first binary association table (BAT) and the second input comprising a second binary association table (BAT);
determining a payload size at least partially based on a number of items in each of the first input and the second input to the join operator, a respective width of items of each of the first input and the second input to the join operator, and an estimated size of an intermediate output of the join operator;
selecting a first memory type for storing the first input from a plurality of memory types in the hybrid memory system based on the payload size, a portion of a cache size of a last-level cache (LLC) to prevent overflow of the LLC, a first count of the first input, and a second count of the second input;
storing the first input in the first memory type and the second input in a second memory type of the plurality of memory types, the first memory type being different from the second memory type;
during execution of the join operator and for each record in the first input:
determining a grow output payload size based on the number of items in each of the first input and the second input to the join operator, the respective width of items of each of the first input and the second input to the join operator, and a grow output corresponding to a respective record, the grow output representing an incremental growth in output of the join operator based on the respective record during execution of the join operator, and
selecting one of the first memory type and the second memory type for storing the grow output based on the grow output payload size and the portion of the cache size of the LLC;
determining an output payload size at least partially based on the number of items in each of the first input and the second input, the respective width of items of each of the first input and the second input, and an actual size of the intermediate output of the join operator;
selecting one of the first memory type and the second memory type for storing the intermediate output of the join operator based on the output payload size and the portion of the cache size of the LLC; and
storing, after execution of the aQEP, the intermediate output in the one of the first memory type and the second memory type in the hybrid memory system.

12. The system of claim 11, wherein the first memory type comprises one of dynamic random access memory (DRAM) and non-volatile memory (NVM).

13. The system of claim 11, wherein the intermediate output is stored in DRAM in response to determining that the output payload size exceeds the portion of the cache size.

14. The system of claim 11, wherein the intermediate output is stored in NVM in response to determining that the payload size does not exceed the portion of the cache size.

* * * * *